United States Patent [19]

Ohnishi

[11] 4,109,256
[45] Aug. 22, 1978

[54] LASER COMPUTER OUTPUT MICROFILMER

[75] Inventor: Masahiro Ohnishi, Asaki, Japan

[73] Assignee: Fuji Photo Film Co., Ltd., Kanagawa, Japan

[21] Appl. No.: 796,281

[22] Filed: May 12, 1977

[51] Int. Cl.² .................... G03B 41/00; G01D 9/42
[52] U.S. Cl. ................................ 354/4; 346/108; 358/302
[58] Field of Search .............. 354/4, 5, 7; 346/108; 358/302

[56] References Cited

U.S. PATENT DOCUMENTS

| | | | |
|---|---|---|---|
| 3,448,458 | 6/1969 | Carlson et al. | 346/108 X |
| 3,965,476 | 6/1976 | Wenander et al. | 346/108 X |
| 3,985,439 | 10/1976 | Keimle | 354/4 X |

Primary Examiner—Michael L. Gellner
Attorney, Agent, or Firm—Sughrue, Rothwell, Mion, Zinn and MacPeak

[57] ABSTRACT

A laser driven computer output microfilmer is operable in an optical registration and focus monitoring mode at a higher than normal (recording) frame repetition rate, to thereby avoid flickering in the eyes of the observer. Such increased repetition rate is implemented by selectively feeding a preprogrammed, abbreviated test pattern to the system input, and the test pattern signal also contains instructions for controlling the vertical scan or deflection mirror in a multi-stepped manner such that the mirror advances through or skips over groups of omitted or blanked frame rows.

4 Claims, 1 Drawing Figure

LASER COMPUTER OUTPUT MICROFILMER

BACKGROUND OF THE INVENTION

This invention relates to a method and apparatus for monitoring the recording output of a laser driven, computer output microfilmer.

A "computer output microfilmer" (hereafter COM) is a system in which output data from a computer is optically superimposed on a slide image provided with format lines, and recorded on a microfilm. In conventional COM's the output data is displayed in the form of numerals, characters or the like on a Braun tube, and the optical image thereof is focused onto a silver salt film through an appropriate lens system.

Recently, a number of highly stable and inexpensive laser systems have been developed, and this has led to the use of laser optical sources in COM's. The laser beam from such a source is intensity-modulated and two-dimensionally deflected by an optical scanning device to sweep over and record on a microfilm. The laser COM has much higher brightness and energy characteristics than a COM employing a Braun tube, whereby relatively cheap and insensitive recording materials may be used, such as a Dry Silver (TM) film, a diazo film, or a thin metal heat-mode film. Thus, the laser COM offers the advantage of avoiding a costly and troublesome wet film development process.

With a COM it is impossible to observe the computer printout in situ; that is, the exposed microfilm must first be developed and then enlarged by a reader or projector. Accordingly, it is necessary to monitor the optical registration between the Braun tube and format slide images, the focusing conditions, etc., in order to ensure satisfactory recording. To meet this requirement conventional COM's are provided with optical viewing monitors operable through a half-mirror or a semi-transparent mirror. In monitoring a Braun tube it is necessary to repeatedly display the image, which may cause a tiring flickering phenomenon depending upon the value of the repetition frequency.

In existing COM's the microfilm recording rate varies from about one frame per second to more than ten frames per second, and the image repetition frequency correspondingly varies from about 1 Hz to about 10 Hz. When an image formed at a low repetition frequency is monitored a slight flickering phenomenon may be observed, but this is not particularly bothersome in a Braun tube because its phosphor has a relatively slow decay rate. In a laser COM, however, flickering is very pronounced at repetition frequencies on the order of several Hz because there is no phospor decay, and as a result the observers eyes tire easily.

The flickering phenomenon depends on the contrast of the black and white image pattern, and tends to decrease as the repetition frequency is increased. The acceptable repetition frequency, called the critical fusion frequency, is thus a function of image brightness, and generally lies in the range from 10-20 Hz. With a laser COM it is possible to monitor the image by suitably controlling the brightness thereof, and the frequency at which the flickering phenomenon is reduced to the point where the observers eyes do not become tired is generally higher than 7 Hz, and preferably higher than 10 Hz.

SUMMARY OF THE INVENTION

Accordingly, an object of this invention is to provide a laser COM with a monitoring device in which no appreciable flickering phenomenon is felt by an observer.

Another object of the invention is to provide a laser COM capable of selectively displaying a predetermined monitoring image frame at a repetition frequency higher than the normal recording frame scan rate.

The foregoing and other objects are achieved by providing a laser computer output microfilmer which comprises a monitoring device for repeatedly displaying an abbreviated test pattern at a frame repetition frequency of 7 Hz or higher by appropriately stepping or skipping the vertical deflection mirror over a number of blank rows in the test pattern or monitoring frame. The monitoring frame signals are preprogrammed and stored in a special test pattern generator, and include instruction signals for controlling the vertical deflection mirror in the desired stepping mode.

BRIEF DESCRIPTION OF THE DRAWINGS

The single drawing FIGURE shows a block diagram of the optical and electrical systems of a laser COM provided with a monitoring device according to this invention.

DETAILED DESCRIPTION OF THE PREFERRED EMBODIMENT

Figure 1:
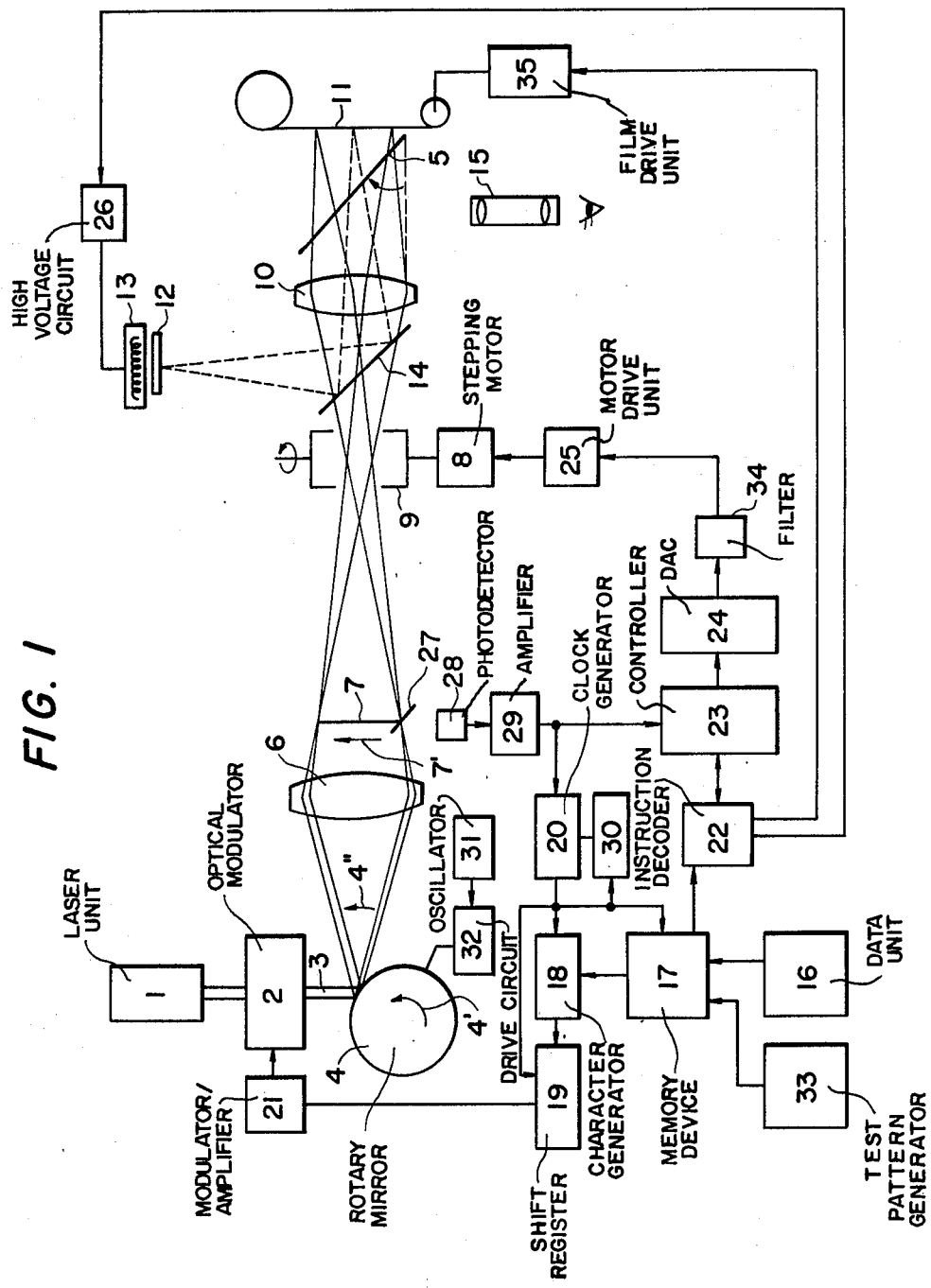

Referring now to the drawing, a light beam emitted from a laser unit 1 is subjected to intensity-modulation by an optical modulator 2, which may be either an acousto-optic or an electro-optic modulator. As an acousto-optic modulator has a superior quenching ratio, it is generally preferred. The intensity modulated light beam 3 is deflected in the direction of arrow 4" by a rotary, multi-surfaced mirror 4, to thus form a scan line 7 in the direction of arrow 7' with the aid of a lens 6. The light beam which forms the scan line 7 is deflected in a direction perpendicular to the plane of the drawing by a mirror 9 driven by a stepping motor 8. The doubly deflected light beam passes through a half-mirror 14 and a lens 10, and is focused into a minute scanning spot on a recording material 11. The mirror 4 is rotated by an oscillator 31 and a drive circuit 32. A format slide 12 is illuminated by a flash lamp 13 and reflected by the half-mirror 14 through the lens 10 and onto the recording material 11. Thus, the image of the format slide is optically superimposed on the data image formed by the scanning spot of the laser beam. To monitor the images formed on the recording material a movable mirror 5 is raised from its dotted line position to that indicated by the solid line, whereby the magnified images may be observed by a telescope 15, as shown in the drawing.

Output signals from a data unit 16 comprising a computer and a magnetic tape unit are stored in a memory device 17 for one frame. After passing through a character generator 18, these signals are subjected to parallel-series conversion by a shift register 19 controlled by a clock generator 20, thereby forming a video signal. The latter is amplitude-modulated by a high frequency carrier wave (110 MHz) and then power-amplified in a modulator/amplifier 21, whose output is applied to the optical modulator 2 to control the intensity of the laser recording beam in accordance with the data unit output.

A variety of methods for synchronizing the scanning and recording operation with the computer or data unit output are available, and one such method will be briefly described.

An instruction signal extracted from the signals stored in the memory device 17 is decoded by an instruction decoder 22, whose output controls the stepping motor 8 through a scan line counter and controller 23, a digital-to-analog (D/A) converter 24, a filter 34, and a motor drive unit 25. The flash lamp 13 is controlled through a high voltage circuit 26, and the film frame feed is controlled through a film drive device 35.

The light at the beginning of each vertical scan by the multi-surfaced mirror 4 is reflected by a stationary knife-edge mirror 27 disposed in the vicinity of the start point of each scan line 7, converted into an electrical signal by a photodetector 28, and amplified by an amplifier 29. This signal serves as a synchronizing signal for each surface of the mirror 4. The clock generator 20 is triggered by the trailing edge of each synchronizing pulse, whereby the clock oscillations are phase synchronized with each surface of the mirror as it rotates. The clock pulses are counted up to a predetermined number (10 dots $\times$ 132 characters = 1320, corresponding to the number of dots required to form one scan line), and thereafter the clock generator oscillations are suspended, whereby speed fluctuations and any geometrical errors in the angular disposition of the mirror surfaces are corrected. This arrangement is described in detail in Japanese patent application Ser. No. 24786/1976. The synchronizing signal thus supplied stepping pulses to the scan line counter and controller 23, whereby a step-like waveform is produced by the D/A converter 24. This waveform is transformed into a sweep waveform by the filter 34, and the mirror 9 is rotated by energizing the stepping motor with the sweep waveform, whereby the scan is advanced across the recording material 11 by a predetermined minimal distance between successive scan lines.

In this embodiment the mirror 4 is made up of twenty-four equally dimensioned and angled surfaces, and is rotated at a constant speed of 10,660 revolutions per minute. The number of lines scanned per second is thus $10,660 \times 24 \div 60 = 4,264$. To scan one frame it takes a period of time required to form 1,056 scan lines, because each frame consists of 66 rows each consisting of 16 scan lines ($1,056 = 66 \times 16$). In addition, the vertical flyback time necessary for the light spot to return to the first line after 1,056 scans corresponds to a time period 10 scan lines. The period of time for displaying one complete frame is therefore equal to the time required to scan 1,066 lines, and the number of frames recorded or scanned per second is thus $4,264/1,066 = 4$. If a frame display is monitored at this recording speed a flickering phenomenon is observed because the repetition frequency is 4 Hz. To eliminate such flicker the repetition frequency must be increased to approximately 10 Hz or higher.

Now, consider the case where the mirror 4 or the stepping motor is rotated at high speed only during monitoring in order to avoid or reduce flicker. In such a case the mirror should be rotated at 20,000 r.p.m. or higher. If the mirror is driven by an ordinary ball bearing type of electric motor, however, it is impossible to achieve such speed for any length of time without burning out the motor and/or bearings. A specially designed high speed motor could be employed, but the cost thereof would be unacceptably high. In addition, high speed operation only during monitoring would require a very intricate drive circuit, and when the recording speed is switched over to such monitoring speed or vice versa the response speed of the mirror until steady state revolution is achieved would be relatively slow. Thus, high speed operation only during monitoring involves a number of difficulties. On the other hand, if only the stepping motor is driven at a high speed no usable image is formed because the number of scan lines per frame is reduced.

The monitoring concept of the present invention will now be described, according to which only some of the rows in one frame are displayed. More specifically, a group of scan rows are formed for just part of a frame to display character images or the like, and the remaining parts of the frame are left blank. Such remaining parts are skipped over by appropriately controlling the motor 8 such that the vertical scan mirror 9 is stepped over a number of lines at one time. That is, the total scan time per frame is reduced to avoid flicker by simply reducing the total content of (the number of lines in) each frame.

The stepping motor 8 employed may be model number G-0612 manufactured by the General Scanning Company, U.S.A. In the stepping operation, the period of time required to step two complete rows (32 scan lines) corresponds to the time necessary to sweep two scan lines, the time to step seven rows corresponds to that necessary to sweep five scan lines, the time to step fifteen rows corresponds to the sweep time for six scan lines, the time to step 35 rows corresponds to the sweep time for eight scan lines, the time to step 50 rows corresponds to the sweep time for nine lines, and the time to step all 66 rows corresponds to the sweep time for ten scan lines. These time correspondence parameters have been determined experimentally. When the motor 8 is not operated in an advanced or accelerated stepwise manner, on the other hand, and a normal sweeping operation is effected, the time required to sweep all of the rows (or 1056 scanning lines) is $\frac{1}{4}$ second, as described before.

This invention is thus intended to increase the repetition frequency by reducing the content of each frame (number of information or character rows/lines per frame), which is implemented by operating the motor 8 in a multi-step manner. When the image is to be monitored the mirror 5 is raised into the optical path, and signals from a preprogrammed test pattern generator 33 are stored in the memory device 17. The data words from the test pattern generator 33 consist of continuous characters or numerals. Instruction words for controlling the stepping motor are also programmed into and supplied by the generator 33, and command the following repetitious operations: after the first seven rows in the upper part of the frame have been swept the next twenty-three rows are stepped or skipped over; after the next seven rows in the central part of the frame have been swept the next 22 rows are stepped over; and after the last seven rows in the lower part of the frame have been swept the light spot returns to its original position at line one. The stepping commands are read by an instruction decoder 22, and the appropriate number of steps are applied to a parallel counter input terminal of the scan line counter and controller 23, and thence to the D/A converter 24, thereby causing the stepping motor 8 to implement the abbreviated monitoring frame scan via the mirror 9. The time required for one frame display is $3(16 \times 7) + 2 \times 8 + 10 = 362$ "scan line times", which is approximately ⅓ of the time necessary to uniformly sweep the entire frame, that is, 1066 "scan line times". Thus, the monitoring frame repetition frequency is approximately three times higher than the normal frame repetition frequency, or about 12 Hz. The flicker phenomenon is therefore barely noticeable, and the monitoring image can be observed with ease. The necessary structure for switching the system input from the data unit 16 to the test pattern (and stepping instruction) generator 33 in synchronization with the raising of the monitor mirror 5, as well as the precise structural configurations of the various electronic components shown in block form, have not been disclosed in detail since they are well known in the art per se, form no part of the present invention, and are not necessary for a full understanding thereof.

It is preferable to energize the flash lamp 13 at approximately 10 Hz higher than the recording frequency. The high voltage circuit 26 comprises a charging capacitor, however, and if the circuit is operated at too high a frequency the lamp often produces relatively dim light or misfires because the firing capacitor does not become fully charged between cycles. A flash frequency of approximately 10 Hz is acceptable here, however, and is scarcely noticeable during the monitoring observation.

While the principle of the invention have been described above in connection with a specific embodiment thereof, it is to be clearly understood that this description is made only by way of example and the invention is not limited by the specific parameters disclosed. For instance, the positions, size and number of frame displays can be suitably determined as required, and a monitoring frame format other than that described may be employed to implement a desired repetition frequency. The monitored image can also be observed by enlarging and projecting it on a suitable screen, without using a telescope. Although in the present invention just the central and peripheral frame rows are displayed, this is quite sufficient for monitoring purposes to confirm whether or not the format slide registration, focusing, etc. are satisfactory. Of course, any desired frame part or parts can be displayed by appropriately compiling the test pattern data and stepping instructions.

What is claimed is:

1. In a laser driven computer output microfilmer including a laser source, means for modulating the intensity of the output beam from the source in accordance with an input data pattern, a first rotatable mirror for repetitively deflecting the modulated beam in a first scanning direction, a second rotatable mirror for deflecting the beam in a second scanning direction, means for synchronizing the rotation of the second mirror with that of the first mirror, whereby the output beam is doubly deflected in a full frame scanning mode, and means for recording the modulated and doubly deflected output beam on a recording medium, means for monitoring the optical registration, focusing, intensity, of the beam, comprising:
 a. step-operable drive means coupled to said second mirror,
 b. means for generating a test pattern signal defining character images occupying only a portion of the full scanning frame, said signal including an instruction signal for controlling said drive means in a multi-step manner to skip the beam over the remaining, unoccupied portion of the frame,
 c. means coupling said test pattern signal to said intensity modulating means,
 d. means coupling said instruction signal to said drive means, whereby a partial frame test pattern is repetitively displayed at an increased frame scan rate, and
 e. optical means for viewing said displayed test pattern.

2. A laser driven computer output microfilmer as defined in claim 1, wherein the full frame comprises a plurality of successive scan rows running in said first scanning direction, and the test pattern frame comprises character images occupying spaced row groups within said full frame, the intermediate row groups therebetween being blanked.

3. A laser driven computer output microfilmer as defined in claim 2, wherein said optical means includes a displaceable mirror insertable in the path of the test pattern display to reflect said display away from said recording means, and means for magnifying said reflected display.

4. A laser driven computer output microfilmer as defined in claim 1, wherein said optical means includes a displaceable mirror insertable in the path of the test pattern display to reflect said display away from said recording means, and means for magnifying said reflected display.

* * * * *

UNITED STATES PATENT AND TRADEMARK OFFICE
CERTIFICATE OF CORRECTION

PATENT NO. : 4,109,256
DATED : August 22, 1978
INVENTOR(S) : Masahiro OHNISHI

It is certified that error appears in the above-identified patent and that said Letters Patent are hereby corrected as shown below:

IN THE HEADING:

insert -- Foreign Application Priority Data --

-- May 13, 1976   Japan........ 51-54730 --

Signed and Sealed this

Thirteenth Day of February 1979

[SEAL]

Attest:

RUTH C. MASON
*Attesting Officer*

DONALD W. BANNER
*Commissioner of Patents and Trademarks*